United States Patent [19]
Cusick et al.

[11] 4,102,307
[45] Jul. 25, 1978

[54] PORTABLE LIVESTOCK STALL

[75] Inventors: Richard D. Cusick; Larry W. Wall, both of Wichita, Kans.

[73] Assignee: Kansas Stall Company, Inc., Wichita, Kans.

[21] Appl. No.: 722,786

[22] Filed: Sep. 13, 1976

[51] Int. Cl.² .............................................. A01K 1/00
[52] U.S. Cl. ...................................... 119/16; 52/222; 119/27
[58] Field of Search ....................... 119/16, 27, 20, 11; 52/284–286, 222, 615, 234

[56] References Cited

U.S. PATENT DOCUMENTS

| | | | |
|---|---|---|---|
| 3,305,986 | 2/1967 | Mathews | 52/615 |
| 3,462,897 | 8/1969 | Weinrott | 52/615 |
| 3,683,427 | 8/1972 | Burkholz | 52/222 |
| 3,693,592 | 9/1972 | Little | 119/16 |
| 3,724,424 | 4/1973 | Benjamin | 119/16 |
| 3,804,065 | 4/1974 | Coates | 119/11 |
| 3,895,606 | 7/1975 | Galloway | 119/16 |

Primary Examiner—Jay N. Eskovitz
Attorney, Agent, or Firm—John W. Widdowson; Edwin H. Crabtree

[57] ABSTRACT

A portable horse stall of modular construction providing various sizes and numbers of stalls which can be quickly erected using interchangable tubular wall frames. The interchangable wall frames include side wall frames, center wall frames, and front wall frames which are pinned together through the use of tubular sleeves and pins. The wall frames have a flexible padding disposed inside the frame and between the inner and outer sides thereof. The padding is enclosed by a tough, flexible, vinyl coated polyester weave fabric. The padding and flexible fabric provide insulation for the stall and a shock resistant cushion to protect the legs of a horse housed therein should the horse be inclined to kick the wall frames.

8 Claims, 19 Drawing Figures

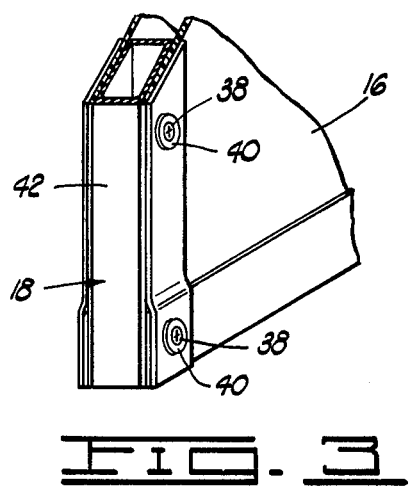
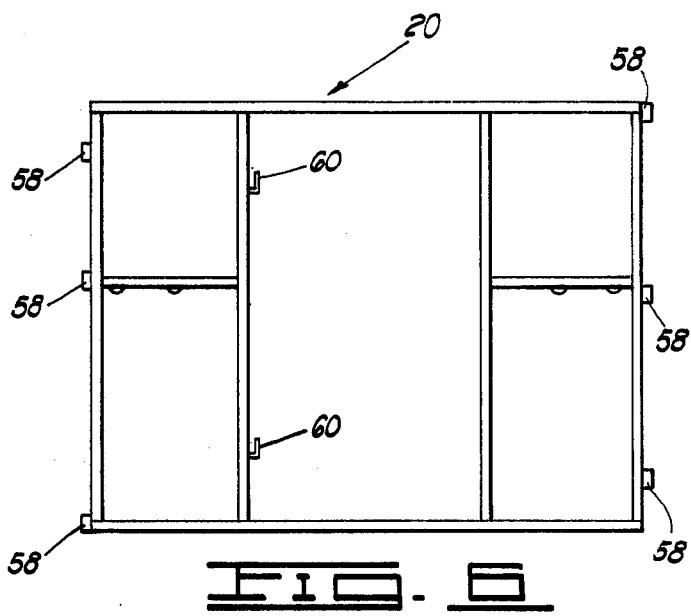
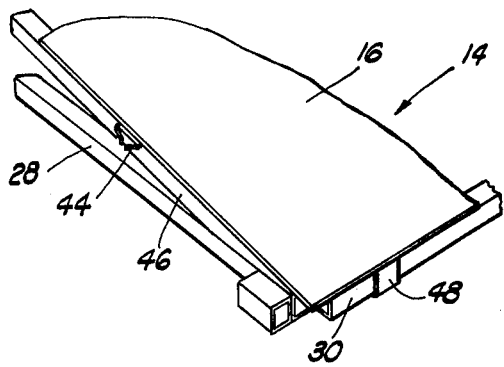
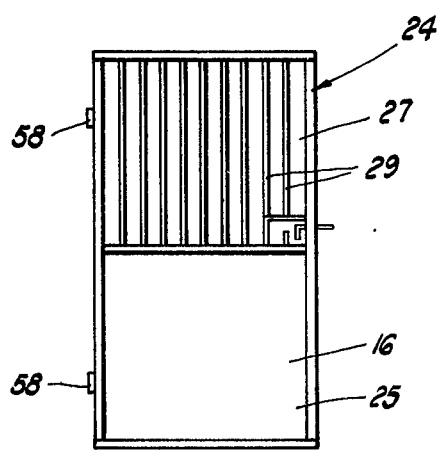
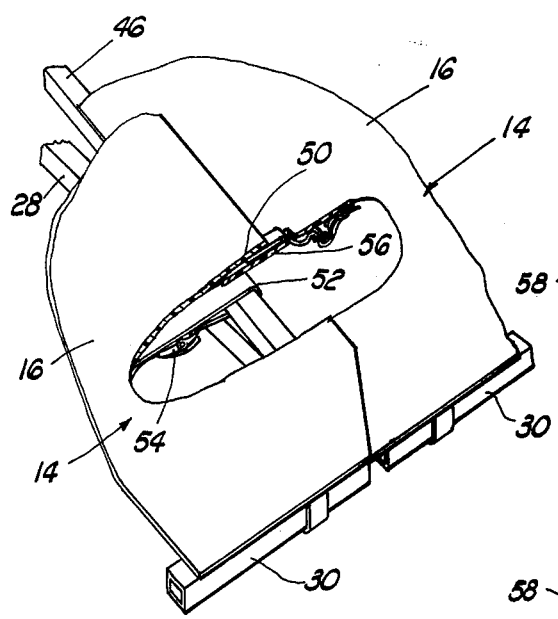
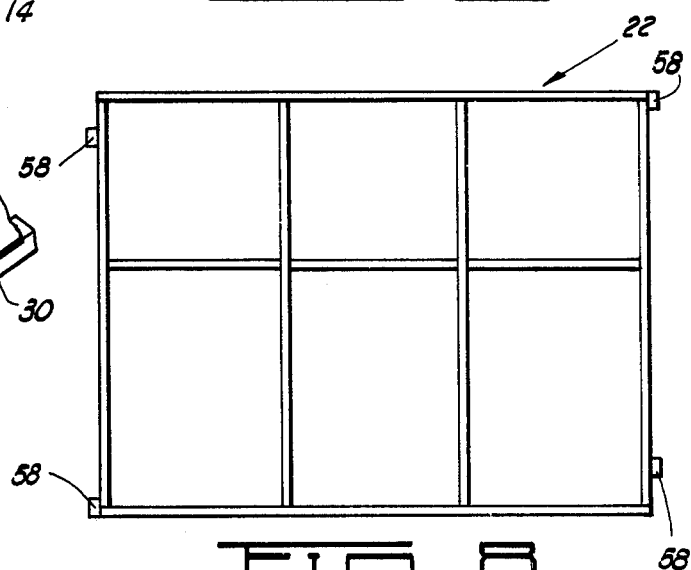

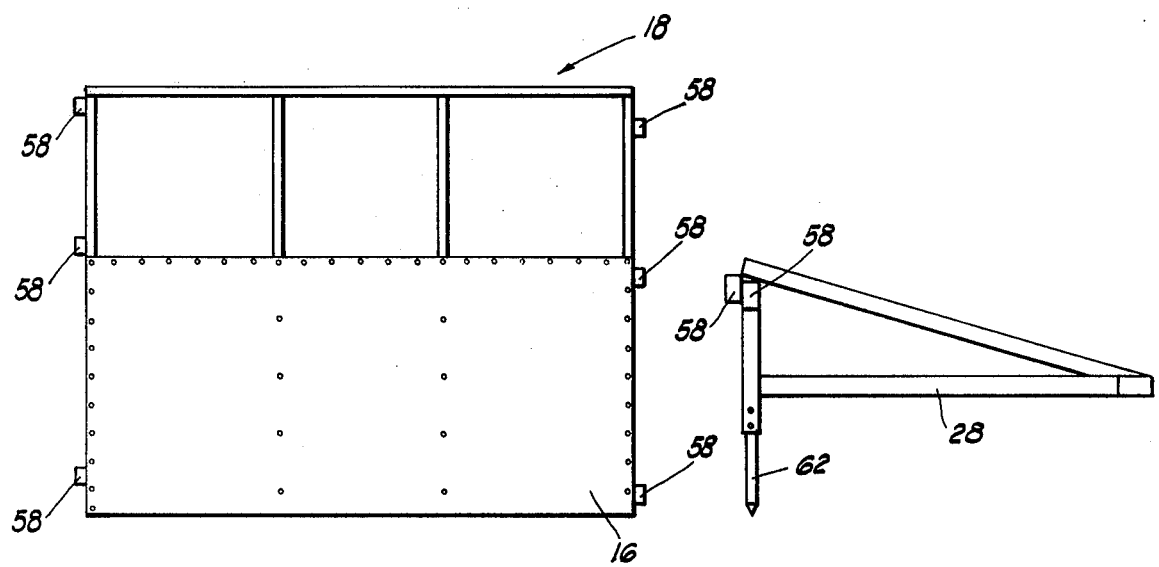
FIG. 9  FIG. 10
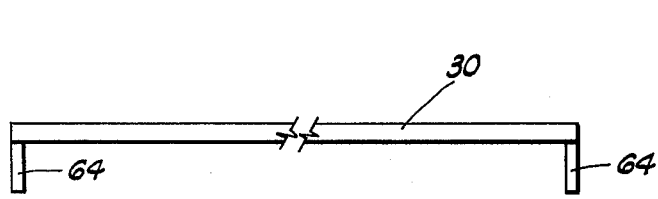
FIG. 11
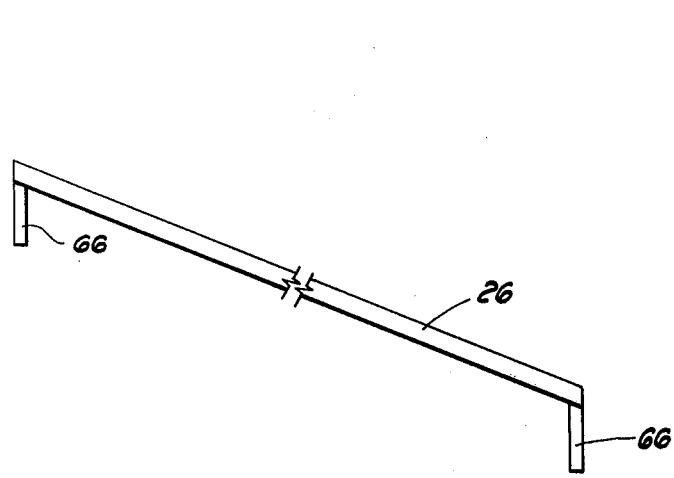
FIG. 12
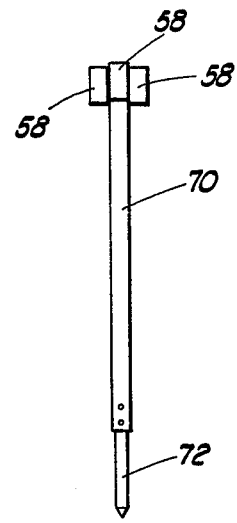
FIG. 13
FIG. 14

PORTABLE LIVESTOCK STALL

BACKGROUND OF THE INVENTION

This invention relates generally to a livestock stall and more particularly, but not by way of limitation, to a portable horse stall.

Heretofore, there have been various types of livestock and horse stalls using various types of construction materials such as plywood sheeting, dimensional lumber, sheet metal, and other types of wall panel material. Also, there are various types of prior art stalls made of different designs, sizes, and arrangements used for housing different types of animals.

None of the prior art stalls provide the advantages of the subject invention and the novel structure as described herein.

SUMMARY OF THE INVENTION

The subject invention provides a highly portable livestock stall used primarily for housing horses wherein the stalls are made of light weight metal tubular wall frames. The wall frames are pinned together through the use of tubular sleeves attached to the frames and receiving pins therein. By adding or removing the wall panels, various sizes of stalls can be quickly constructed.

The stalls may be erected in an enclosed building, or outside. The outside stalls are enclosed through the use of tubular rafters, trusses, and eaves attached to the top of the vertical wall frames thereby providing a roof frame for receiving a flexible fabric used as a roof.

The wall frames are insulated by the placement of insulated padding disposed between the tubular structure of the wall frames and between the inner and outer sides of the frames. The padded insulation is contained therein by attaching the flexible fabric to the inner and outer sides of the wall frame.

The flexible fabric and insulated padding provide a shock resistant cushion to protect the legs of the horse housed in the stall should he kick the sides of the wall frames.

The portable livestock stall includes a pair of vertical, tubular, parallel side wall frames, a vertical, tubular center wall frame, and a vertical, tubular front frame having a door pivotly attached thereto. The front wall frame is parallel to the center wall frame. The front wall frame and center wall frame are attached to the ends of the side wall frames. A plurality of pins are received in tubular sleeves attached to the wall frames for connecting together the stall frame. The stall frame further includes flexible padding disposed between the tubular structure and the inner and outer sides of the wall frames. The flexible padding is retained inside the wall frames by a flexible fabric attached to the inner and outer sides of the wall frames.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1A is a sectional view of a side wall frame taken along lines 1A — 1A shown in FIG. 1.

FIG. 3 is a sectional view of a side wall frame showing the cover material attached to the tubular structure of the frame.

FIG. 4 is a sectional view of a roof frame having a portion of the roof attached thereto.

FIG. 5 is a sectional view of the roof frame showing the overlapping of the roof on adjoining stalls.

FIG. 6 is a front view of a front wall panel.

FIG. 7 is a front view of a door.

FIG. 8 is a front view of a center wall panel.

FIG. 9 is a front view of the side wall panel with a flexible fabric attached thereto.

FIG. 10 is a front view of a roof eave.

FIG. 11 is a front view of a roof rafter.

FIG. 12 is a front view of a roof truss.

FIG. 13 is a front view of a connecting pin.

FIG. 14 is a front view of a truss pin.

DETAILED DESCRIPTION OF THE DRAWINGS

Figure 1:
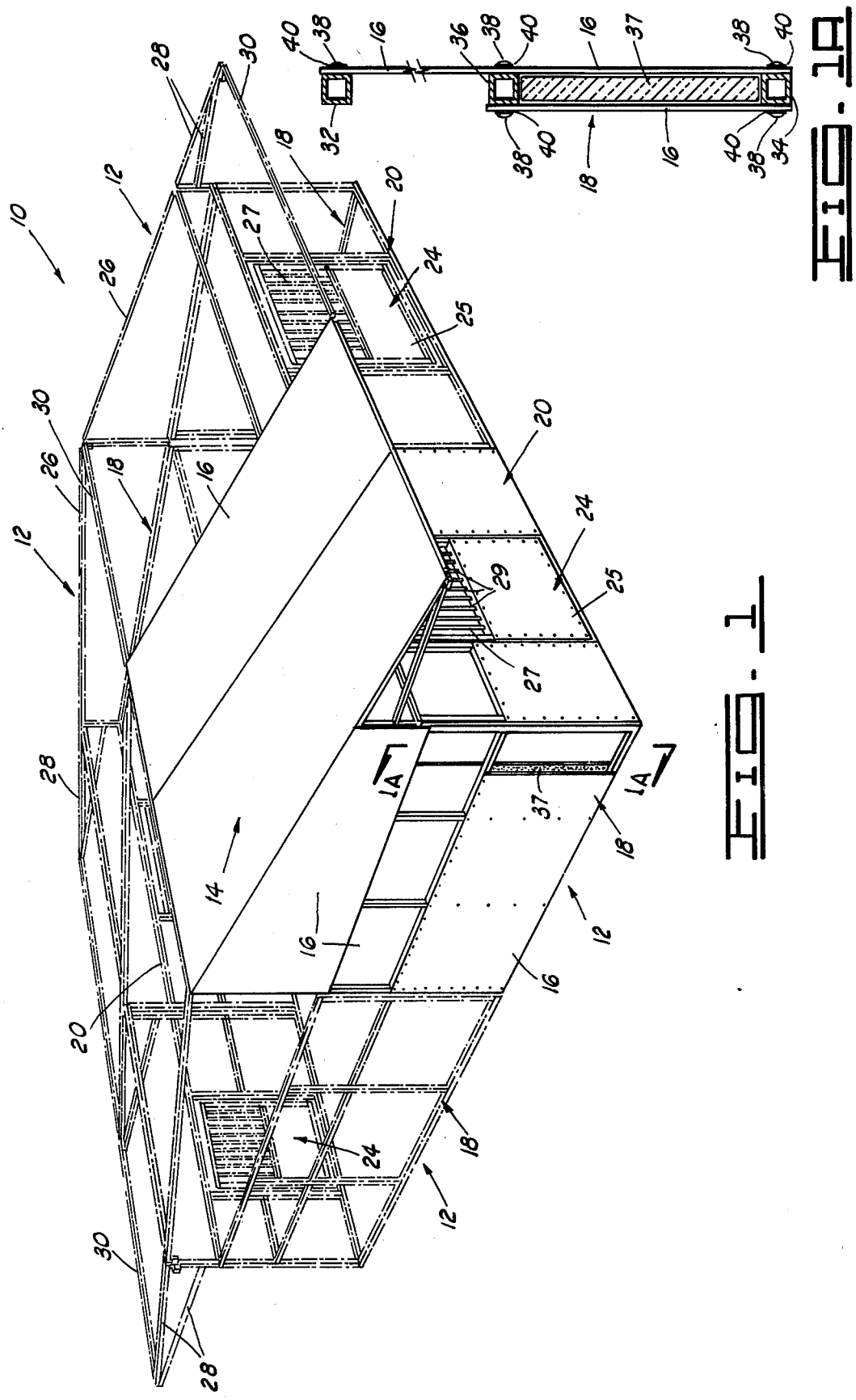
FIG. 1 is a perspective view of the portable livestock stall having four individual stalls interconnected with one of the stall frames enclosed.

In FIG. 1, the portable horse stall is designated by general reference numeral 10. The stall 10 includes, in this figure, four individul horse stalls 12 interconnected with a common roof 14 attached to the top of the stalls 12.

The stall 12 closest to the viewer in FIG. 1 is covered with a flexible fabric 16 such as vinyl coated, polyester weave material or the like. This type of material used to cover the stalls 12 is particularly important in that it must be rugged in construction and durable to withstand various types of weather conditions, wind, and harsh treatment by the animal housed therein. The weight of the material used on the sides of the stalls 12 is 28 ounces per square yard while the material on the roof 14 is 16 ounces per square yard.

The individual stalls 12 are comprised of a pair of vertical parallel side wall frames 18, a front wall frame 20, and a center wall frame 22. The center wall frame 22 is shown in FIG. 8. The front wall frame 20 includes a pivotly attached door frame 24 for providing entrance into the stall 12. The door frame 24 includes a lower portion 25 which is covered with the fabric 16 and an upper portion 27 having vertical bars 29. While this type of door frame 24 is illustrated, it is recognized that dutch doors or any other type of door could be used equally well.

The frames 18, 20, and 22 are constructed of light weight metal tubing which can be quickly assembled and disassembled and stored one on top of the other.

When the stall 10 is erected outside, the roof 14 is attached and includes a roof frame comprised of roof trusses 26, roof eaves 28, and roof rafters 30 which are connected to the top of the wall frames 18, 20, and 22. The roof frame is then covered with the flexible fabric 16 and secured thereto thereby closing the top of the stalls 12.

In FIG. 1A, a sectional view taken along lines 1A — 1A, shown in FIG. 1, illustrates a portion of the side wall frame 18. The frame 18 includes an upper cross bar 32, a lower cross bar 34, and a center cross bar 36. Disposed between the lower cross bar 34 and the center cross bar 36 is an angular shaped flexible padding 37 which is retained therein by the attachment of the flexible fabric 16 attached to the inner and outer sides of the cross bars 32, 34, and 36 by self tapping screws 38 and washers 40. The combination of the flexible fabric 16 and the flexible padding 37 provides insulation for the stalls 12 and a shock resistant cushion to protect the legs of a horse when he kicks the wall frames. The padding 37 may be made of styrofoam or any other similar type of flexible insulating material. While FIG. 1A discusses the padding 37 and fabric 16 attached to the side wall frame 18, the padding 37 and fabric 16 are also applied to the center wall frame 22, front wall frame 20, and door frame 24.

Figure 2:
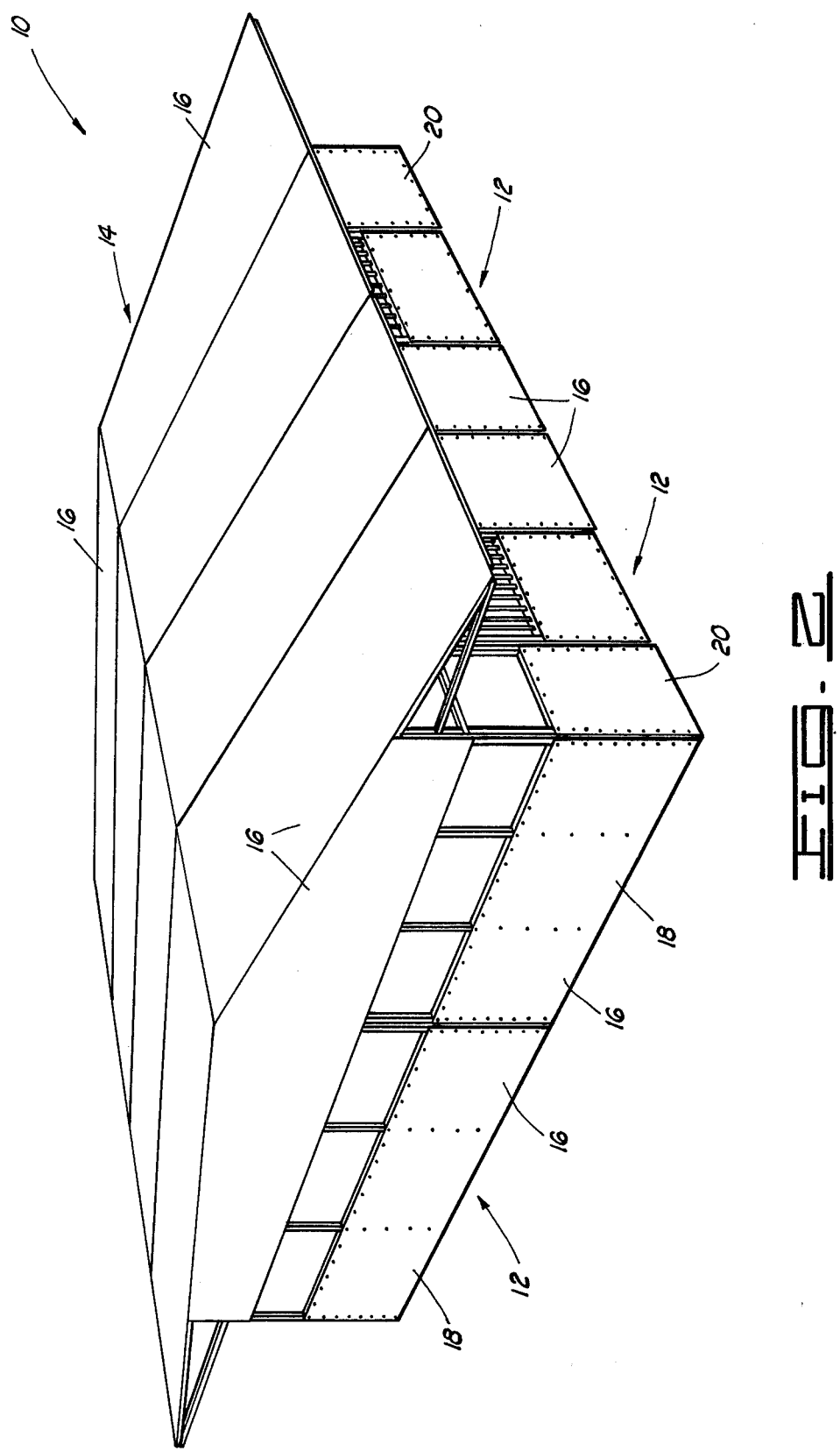
FIG. 2 is a perspective view of the portable horse stall completely enclosed.

In FIG. 2, a perspective view of the stall 10 is illustrated with the individual stalls 12 and the roof 14 completely enclosed with the flexible fabric 16 and the lower portion of the wall frames having the padding 37 housed therein. It should be noted that as a matter of economy, only the lower portion of the wall frames is covered on both sides with the flexible fabric 16 and padding 37 contained inside. The upper portion of the wall frames has only the inner side covered with the fabric 16. To completely insulate the wall frames, the fabric 16 could cover both sides of the frames with padding 37 therebetween.

In FIG. 3, a sectional view of a portion of the side wall frame 18 is illustrated wherein the flexible fabric 16 is attached to a vertical bar 42 by the self tapping screws 38 and washers 40. It should be noted that in this view the hollow tubular structure of the side wall frame 18 can be seen.

In FIG. 4, a sectional view of a portion of the roof 14 is illustrated with the flexible fabric 16 secured to the roof eave 28 by an "L"-shaped hook 44 secured around an angular bar 46 of the eave 28. The front edge of the flexible fabric 16 includes a flexible nylon strap 48 which is secured around the rafter 30. The strap 48 is tightened by a buckle secured on the underside of the fabric 16.

In FIG. 5, a sectional view of the roof 14 is illustrated wherein additional stalls 12 and an added roof 14 is required. The flexible fabric 16 is provided with an overlapping lip 50 having a strap 52 which is secured around the angular bar 46 of the eave 28 and tightened through a buckle 54. The adjacent roof 14 includes the flexible fabric 16 having a lip 56 which is tucked under the adjacent lip 50 to prevent rain from leaking between the stalls 12.

FIG. 6 illustrates a front view of the front wall frame 20. The front wall frame 20 includes hollow sleeves 58 attached to each end for receiving pins therein so that it may be attached to the side wall frames 18. The front wall frame 20 further includes hinges 60 for receiving hollow sleeves 58 attached to one end of the stall door frame 24 illustrated in FIG. 7. It should be noted that the lower portion of the door frame 24 is also covered by the flexible fabric 16 and has the flexible padding 37 disposed therein.

In FIG. 8, a front view of the center wall frame 22 is illustrated with the hollow sleeves 58 attached at each end. The panel 22 is shown without the attached fabric 16 and padding 37.

In FIG. 9, the side wall frame 18 is illustrated with the hollow sleeves 58 attached to either end. In this view, the side wall frame 18 is illustrated having the flexible fabric 16 attached thereto. The wall frames 18, 20, and 22 are constructed so that when they are disassembled, the fabric 16 and padding 37 need not be removed and the frames can be stacked neatly on top of each other until the stalls 12 are again assembled.

FIG. 10 illustrates the roof eave 28 having a pointed end portion 62 for slidably inserting into the hollow sleeves 58 mounted on the ends of the wall frames. The roof eave 28 also includes hollow sleeves 58 for slidably receiving one end of the roof rafters 30 and roof trusses 26.

In FIG. 11, the roof rafter 30 is illustrated having downwardly extending end portions 64 for inserting into the hollow sleeves 58 of the roof eaves 28.

In FIG. 12, the roof truss 26 is illustrated also having downwardly extending end portions 66 which are received in the hollow sleeves 58 of the roof eaves 28 and truss pins 70 discussed under FIG. 14.

In FIG. 13, an angular shaped pin 68 is illustrated which is used for inserting through the hollow sleeves 58 for connecting together the wall frames and at the bottom of the wall frames for securing the stalls 12 to the ground surface.

In FIG. 14, the vertical truss pin 70 is illustrated having a pointed end portion 72 for inserting into the hollow sleeves 58 of the wall frames. The pin 70 includes hollow sleeves 58 mounted at the top thereof for receiving the end portion 64 of the rafter 30 and the end portion 66 of the roof truss 26.

Figure 15:
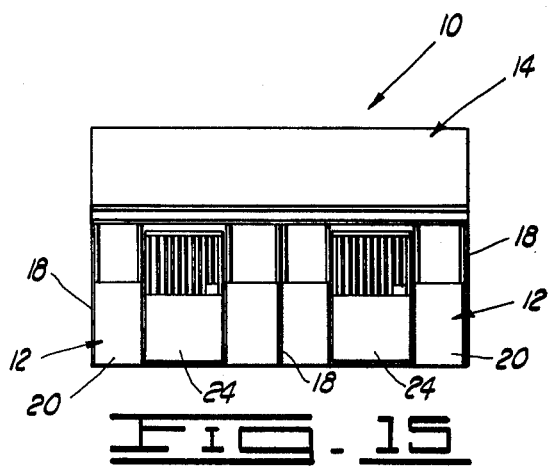
FIG. 15 is a front view of the portable horse stall with two adjacent horse stalls interconnected.

In FIG. 15, a front view of the horse stall 10 is illustrated having a pair of individual horse stalls 12 disposed adjacent to each other. In this illustration, the stalls 12 would have a common side wall frame 18 between each stall.

Figure 16:
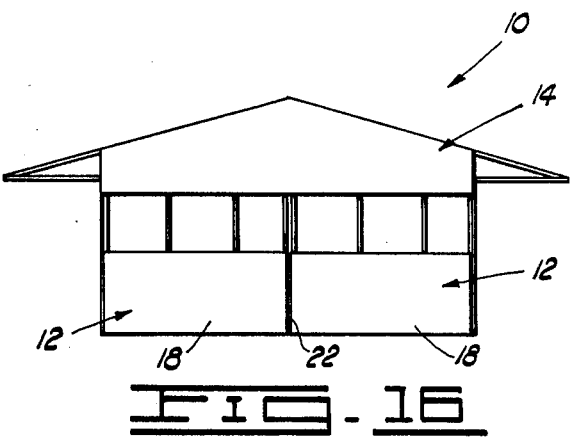
FIG. 16 is a side view of the portable horse stall having a pair of horse stalls interconnected.

In FIG. 16, a side view of the horse stall 10 is illustrated with the individual horse stalls 12 back to back. In this illustration, the stalls 12 would have a common center wall frame 22.

Figure 17:
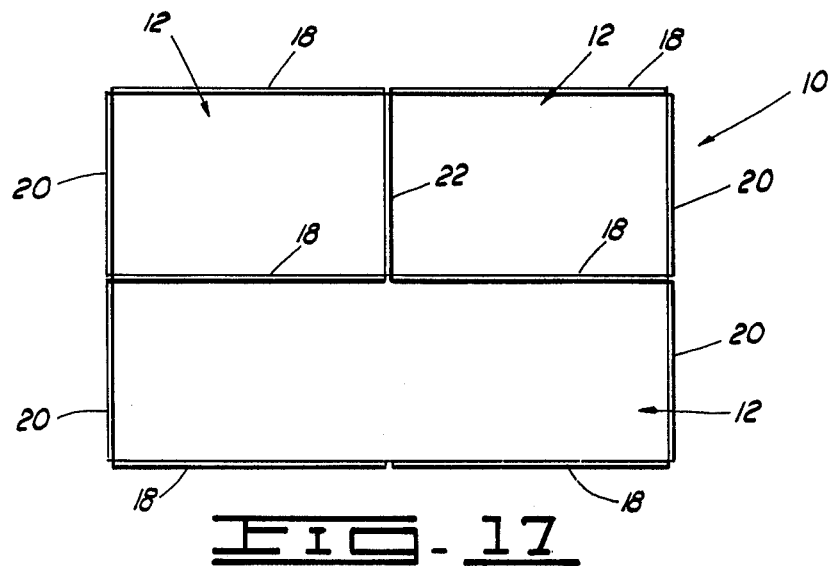
FIG. 17 is a top plan view of four horse stalls interconnected with a center wall panel removed to enlarge the length of one of the horse stalls.

FIG. 17 illustrates a top view of the horse stall with the roof 14 removed showing a floor plan of the individual stalls 12. In this illustration, one of the center panels 22 is removed thereby increasing the length of the individual horse stall 12.

Figure 18:
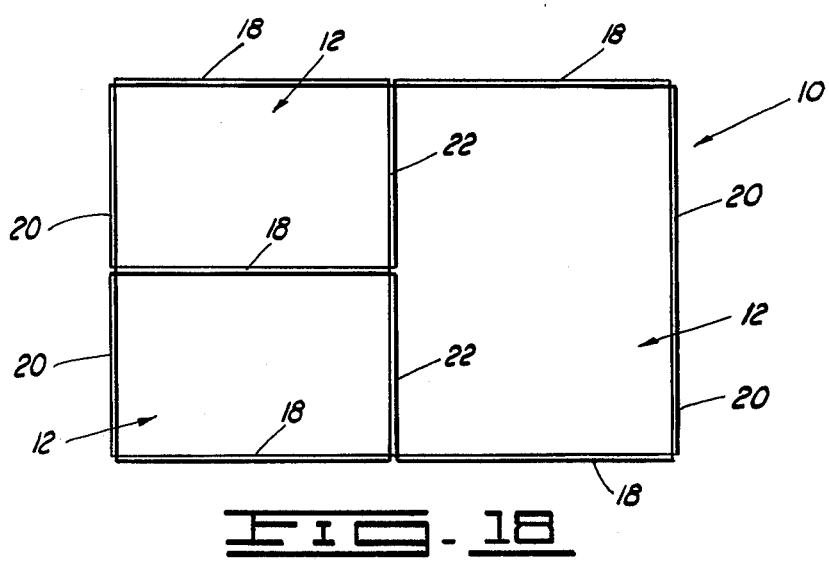
FIG. 18 is a top view of four horse stalls interconnected with a side wall panel removed to increase the size of one of the horse stalls.

In FIG. 18, a top view of the stall 10 is illustrated, but in this example, one of the side wall panels 18 is removed to increase the size of the individual stall 12.

FIGS. 17 and 18 are shown to illustrate the flexibility of the stall 10 by removing center panels 22 and side wall panels 18 to increase the size of the individual stalls 12. This would be particularly important should the horse be giving birth to a colt or should it be desired to house more than one horse in an individual stall 12.

Changes may be made in the construction and arrangement of the parts or elements of the embodiments as disclosed herein without departing from the spirit or scope of the invention as defined in the following claims.

I claim:

1. A portable livestock stall for installing on top of the ground surface, the stall comprising:
    a pair of vertical, tubular, parallel side wall frames;
    a vertical, tubular center wall frame;
    a vertical, tubular front wall frame parallel to said center wall frame and having a door pivotally attached thereto;

a plurality of pins received in tubular sleeves attached to the ends of said wall frames for connecting together the ends of said side wall frames to the ends of said front wall frame and said center wall frame thereby forming a stall frame, said pins being of sufficient length for extending through said tubular sleeves adjacent the ground surface and into the ground surface for securing the stall thereto;

flexible padding disposed between the inner and outer sides of said wall frames; and flexible fabric attached to the inner and outer sides of said wall frames for retaining said padding therein and enclosing said stall frame.

2. The stall as described in claim 1, wherein said flexible padding is an insulation material made of styrofoam for insulating said stall frame and providing a shock resistant cushion should an animal kick said wall frame.

3. The stall as described in claim 1, wherein said flexible fabric is made of vinyl coated polyester weave material.

4. The stall as described in claim 1, further including a plurality of side wall frames, center wall frames, and front wall frames interconnected to form individual stalls adjacent to each other.

5. The stall as described in claim 4, wherein the size of the individual stall may be enlarged by removing a side wall frame which is a common wall to adjacent individual stalls.

6. The stall as described in claim 4, wherein the size of the individual stall may be enlarged by removing a center wall frame which is a common wall to adjacent individual stalls.

7. The stall as described in claim 1, further including a plurality of rafters, trusses, and eaves constructed of metal tubing, said rafters, trusses, and eaves interconnected to the top of said wall frames for providing a roof frame thereon.

8. The stall as described in claim 7, further including a flexible fabric attached to the top of said rafters, said trusses, and said eaves for providing a roof cover on top of said roof frame.

* * * * *